United States Patent [19]
Hattori et al.

[11] Patent Number: 5,208,883
[45] Date of Patent: May 4, 1993

[54] METHOD OF REINFORCING OPTICAL FIBER COUPLER

[75] Inventors: Tomoyuki Hattori; Hiroshi Suganuma; Hiroaki Takimoto, all of Kanagawa; Kazuhiko Arimoto, Tokyo, all of Japan

[73] Assignees: Sumitomo Electric Industries, Ltd., Osaka; Sumiden Opcom, Ltd., Tokyo, both of Japan

[21] Appl. No.: 923,616

[22] Filed: Aug. 3, 1992

[30] Foreign Application Priority Data

Aug. 1, 1991 [JP] Japan .................. 3-193083

[51] Int. Cl.⁵ ............................. G02B 6/26
[52] U.S. Cl. ......................... 385/43; 385/42; 385/99
[58] Field of Search ............ 385/42, 43, 44, 45, 385/46, 47, 48, 99

[56] References Cited

U.S. PATENT DOCUMENTS

| | | | |
|---|---|---|---|
| 4,714,316 | 12/1987 | Moore et al. | 350/96.20 |
| 4,906,068 | 3/1990 | Olson et al. | 385/43 |
| 5,011,251 | 4/1991 | Miller et al. | 385/43 |

FOREIGN PATENT DOCUMENTS

| | | |
|---|---|---|
| 0106116 | 4/1984 | European Pat. Off. . |
| 0475494 | 3/1992 | European Pat. Off. . |
| 1-134405 | 5/1989 | Japan .................. 385/43 |
| 0083504 | 3/1990 | Japan .................. 385/43 |
| 2207254 | 1/1989 | United Kingdom . |
| 2217473 | 10/1989 | United Kingdom . |

Primary Examiner—Akm E. Ullah
Assistant Examiner—Phan Thi Heartney
Attorney, Agent, or Firm—Cushman, Darby & Cushman

[57] ABSTRACT

A method of reinforcing a multiple optical fiber coupling unit is provided including the steps of removing a portion of longitudinal coatings of optical fibers of the multiple optical fiber coupling unit to expose glass portions of said optical fibers; fusing a portion of the exposed glass portions so as to optically couple the optical fibers; extending the fused portion to a predetermined state; fixing non-extended portions of the exposed glass portions on a first reinforcing substrate with a first adhesive; and fixing the first reinforcing substrate on a second reinforcing substrate with a second adhesive. The multiple optical fiber unit coupler made by this method has a transmission characteristic that does not substantially change even with a temperature change and under high humidity.

11 Claims, 1 Drawing Sheet

METHOD OF REINFORCING OPTICAL FIBER COUPLER

BACKGROUND OF THE INVENTION

The present invention relates to a method of reinforcing an optical fiber coupler manufactured by fusing and then extending a plurality of optical fibers. The optical fibers are secured to a substrate by adhesive.

Conventional optical fiber couplers are apt to change in characteristic or are easily damaged by an external force or a temperature change since they have a fine-diameter portion with an outer diameter sized in micrometers. In order to protect the conventional optical fiber coupler against an external force so as to assure that a stable characteristic is maintained, the conventional optical fiber coupler has been fixed on a reinforcing substrate having a coefficient of linear expansion substantially equal to that of quartz. A plate-like member has been used as the reinforcing substrate, as disclosed, for example, in Japanese Utility Model Unexamined Publication No. Sho. 60-4308. Further, as another example of the reinforcing substrate, a pipe-shaped member has been disclosed in Japanese Patent Unexamined Publication No. Sho-64-63907. In addition, a thermosetting or ultraviolet-setting type adhesive of an epoxy group, an urethane acrylate group, or a cyanoacrylate group has been employed as the conventional coupler fixing adhesive.

Recently, light communication lines has been promoted which has increased the use of optical fiber couplers. In this regard, however, there has been a disadvantage in that the occupation area of conventional couplers has increased and the method of accommodating excessive length of optical fibers has become complicated, since each conventional coupler is constituted by a pair of optical fibers.

Japanese Patent Unexamined Publication No. Hei-1-295211 discloses a method in which an optical fiber coupler, constituted by two optical fibers, is fixed on a reinforcing member. A plurality of such reinforcing members are accommodated in a package, and optical fibers outside the package are formed into tape-like, multiple optical fiber units. Further, Japanese Patent Unexamined Publication No. Sho-63-254406 discloses a method in which an optical fiber coupler, constituted by two optical fibers, is provided in each of a plurality of grooves of a fixing portion shaped in the form of teeth of a comb.

However, in each of the methods disclosed in the above Japanese Patent Unexamined Publication Nos. Hei. 1-295211 and Sho-63-254406, there has been a problem in that much time is required to manufacture the multiple optical fiber unit couplers by such methods because the optical fiber couplers, each constituted by two optical fibers, are densely mounted. Although a trial manufacture of a multiple optical fiber unit coupler from multiple optical fiber units has been made, a problem exits in that when the multiple optical fiber unit coupler is fixed on a reinforcing substrate, the transmission characteristic remarkably changes with a temperature change and under high humidity.

SUMMARY OF THE INVENTION

An object of the present invention is to provide a method of producing a reinforcing structure of a multiple optical fiber unit coupler so that the transmission characteristic does not remarkably change even under a temperature change and under high humidity.

In accordance with the principles of the present invention, this objective is obtained by providing a method of reinforcing a multiple optical fiber unit coupler in which longitudinal coatings of multiple optical fiber units are partially removed to thereby expose glass portions of the coated optical fibers. The glass portions are fused and then extended. The method provides that only non-extended portions of the exposed glass portions are fixed on a first reinforcing substrate with an adhesive with the first reinforcing substrate being fixed on a second reinforcing substrate with a soft adhesive.

DETAILED DESCRIPTION OF THE PRESENTLY PREFERRED EXEMPLARY EMBODIMENT

Figure 3A:
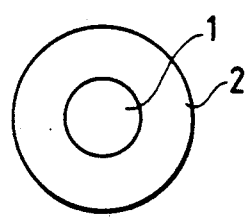
FIGS. 3A and 3B are end views of a coated optical fiber provided in accordance with the principles of the present invention.
Figure 3B:
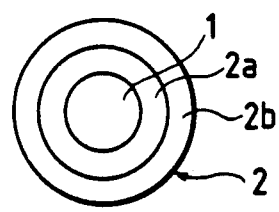
Figure 4:
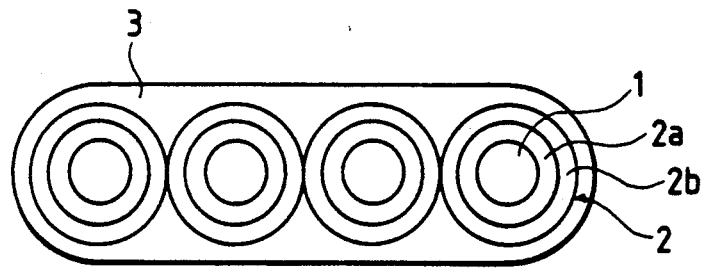
FIG. 4 is an end view of a multiple coated optical fiber unit provided in accordance with the principles of the present invention.

Referring to FIG. 3(A), a coated optical fiber 10 according to the present invention is shown. The optical fiber 10 includes a resin coating layer 2 formed on an outer circumferential portion of a quartz glass 1 having a core and a cladding portion. The coating resin 2 is preferably thermosetting or ultraviolet-setting resin, of a urethane acrylate group, a silicone group, epoxy group, or the like. The coated optical fiber 10 shown in FIG. 3(B) has a coating layer 2 constituted by two layers, a first layer 2a and a second layer 2b. Further, FIG. 4 shows a multiple optical fiber unit 11 provided in accordance with the principles of the present invention. The multiple optical fiber unit 11 has coating resin 3 disposed about the periphery of a plurality of coated optical fibers 10. The coated optical fibers 10 are disposed in parallel and are collectively coated by the coating resin 3. The coating resin 3 is preferably thermosetting or ultraviolet-setting resin, of a urethane acrylate group, a silicone group, or an epoxy group. However, other similar coatings may be used.

Figure 1:
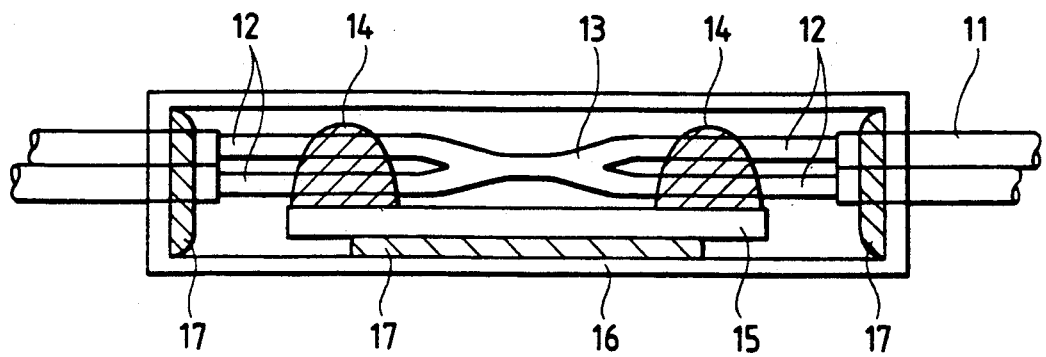
FIG. 1 is an explanatory diagram showing the reinforcing structure of an optical coupler produced by the method according to the present invention.
Figure 2:
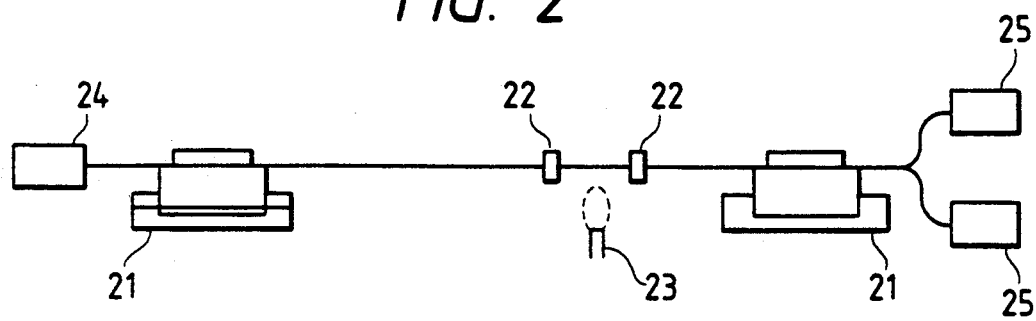
FIG. 2 is an explanatory diagram showing an embodiment of the present invention.

FIG. 1 shows the reinforcing structure of a multiple optical fiber coupler 11 produced by the method according to the present invention. FIG. 2 shows an example of the method of producing the coupler.

FIG. 1 shows a multiple optical fiber unit 11, a glass portions 12 of coated optical fibers with their coatings removed, and an extended portion 13 formed by fusing and drawing the glass portions 12. The non-extended glass portions 12, on the opposite sides of the extended portion 13, are fixed on a first reinforcing substrate 15 with an adhesive 14. Further, a second reinforcing substrate 16 is provided. The first reinforcing substrate 15 is fixed to the second reinforcing substrate with a soft adhesive 17. Coating portions of the respective multiple optical fiber units 11 are similarly fixed with the soft adhesive 17 to the opposite end surfaces of the second reinforcing substrate 16.

The first reinforcing substrate 15 is preferably made of a material such as quartz, LCP (liquid crystal polymers) or the like, which has a coefficient of linear expansion substantially equal to that of the optical fibers 10. Since the expansion coefficients are substantially equal, stress exerted on a light-coupling portion of the coupler due to thermal expansion/shrinkage of the substrate caused by a change in circumferential temperature, is prevented.

The adhesive 14 may be, for example, an adhesive of the thermosetting or ultraviolet-setting type of a urethane acrylate group, an epoxy group, or an cyanoacrylate group. It is preferable to use a material having a coefficient of linear expansion substantially equal to that of optical fibers and having the same shock resistance as that of the optical fibers as the second reinforcing substrate 16. Since the first and second reinforcing substrates 15 and 16 are fixed to each other through the soft adhesive 17, the coefficient of linear expansion is not always substantially equal to that of the optical fibers. Therefore, it is preferable to use a material, such as LCP, Invar, or the like for the reinforcing substrate 16. Further, the shape of the substrate 16 is preferably box-like or cylindrical so as to assure sealing in order to protect small-diameter portions of the coupler and to prevent dust from entering the coupler.

Further, according to the present invention, the soft adhesive 17 is used to relieve stress created in the light coupling portion of the optical fiber coupler by expansion or shrinkage of the coating resin 2 of the coated optical fibers 10. The soft adhesive 17 is therefore preferably made of room-temperature hardening silicone rubber. Moreover, it is desirable that the soft adhesive 17 be flexible even at a low temperature, and it is particularly preferable that the Young's modulus be no larger than $0.1 \text{ kg/mm}^2$ at $-40°$ C.

FIG. 2 shows extending stages 21, optical fiber clamps 22, a micro-torch 23, a light source 24 and power meters 25. In manufacturing an optical fiber coupler as described above, first, a portion of a coating of the multiple optical fiber unit 11 is removed and exposed glass portions 12 are fixed by using the optical fiber clamps 22. Then, the glass portions 12 are subjected to thermal fusion by using the micro-torch 23. The micro-torch 23 utilizes a gas mixture of oxygen and hydrogen, oxygen and propane, or oxygen and acetylene. The gas mixture, however, is not limited to those listed above. As an alternative to the micro-torch 23, a heat source such as a resistance furnace, a ceramic heater, an infrared heater, or the like may be used.

The optical fiber clamps 22 are removed after fusion and the fused portions are subjected to a thermal extension process by applying tension to the fused optical fibers. At this time, the thermal extension process is performed by monitoring the branching state of the coupler with the light source 24 and the power meters 25. When a predetermined branching state is realized, the extension process is stopped. Next, the first reinforcing substrate 15 is located at a predetermined position, and only non-extended portions of the exposed glass portions 12 are fixed on the first reinforcing substrate 15 with the adhesive 14. Thereafter, the first reinforcing substrate 15 is fixed onto the second reinforcing substrate 16 by using the soft adhesive 17. At this time, it is preferable that the end portions of the second reinforcing substrate 16 are sealed by using the soft adhesive 17 so as to prevent dust from entering externally.

Generally, when a multiple optical fiber unit coupler is fixed on a reinforcing substrate, non-extended portions 12 and coated portions are fixed on the substrate. If a temperature change occurs or high humidity is present after such fixing, coating resin 2 and coating resin 3 of the coated optical fibers shrink. In the case of an ordinary optical fiber coupler, the occupation area of the coating resin is so small that, even if shrinkage occurs, no stress is generated in a light-coupling portion because the non-extended portion 12, where coatings are removed, is fixed with an adhesive. However, in a multiple optical fiber unit coupler, the occupation area of coating resin is so large that the shrinkage force cannot be suppressed by an ordinary adhesive to thereby allow deformation of the adhesive or separation between the adhesive and the coated optical fibers. Therefore, in conventional multiple optical fiber unit couplers, stress is generated in a light-coupling portion causing a change in the transmission characteristic thereof.

This problem is eliminated by the reinforcing structure produced by the method according to the present invention. Since the first reinforcing substrate 15 and the non-extended portions 12 are fixed to each other, stress is not generated in the light-coupling portion by an external force or by a temperature change. In addition, the light-coupling portion is not influenced by the shrinkage of the coating resin. Further, the influence by shrinkage of the coating resin is absorbed by the soft adhesive 14 fixing the first and second reinforcing substrates 15, 16 to each other.

According to the present invention, in order to make the foregoing operation effective, it is necessary that the first reinforcing substrate 15 and the adhesive 14 are made to sufficiently adhere to each other, and it is therefore preferable that when four coated optical fibers are used as the multiple optical fiber unit 11, the coating length of the adhesive 14 is not smaller than 5 mm. Further, in order to make the soft adhesive 14 absorb the influence of shrinkage of the coating resin, it is preferable that the distance from the fixing portion between the first reinforcing substrate 15 and the non-extended portions 12 to the end of the second reinforcing substrate 16 is long. For example, it is preferable to select the distance to be not shorter than 5 mm when four coated optical fibers are used as the multiple optical fiber unit.

Next, an example of the present invention will be described. In accordance with the above-mentioned method, a coupler having a 50% branch ratio at 1.3 $\mu$m was manufactured for trial using a multiple optical fiber unit in which four optical fibers were arranged parallel to each other. Each optical fiber consisted of a 1.3 $\mu$m single mode fiber having a ratio of refractive index between the core and cladding of 0.3%, with a core diameter of 8 $\mu$m and a cladding diameter of 125 $\mu$m. Quartz was used as the first reinforcing substrate 15, Invar was used as the second reinforcing substrate 16, an ultraviolet-setting adhesive in an urethane acrylate group was used as the adhesive 14, and room temperature hardening silicone rubber was used as the soft adhesive 17. The Young's modulus of the soft adhesive at 25° C. and $-40°$ C. was $0.07 \text{ kg/mm}^2$ at both temperatures.

The coupler was subjected to a heat cycle test at $-40°$ to $+85°$ C. As a result of measurement of a fluctuation of the insertion loss during the test by the use of an LED having a wavelength of 1.3 $\mu$m, a good characteristic (fluctuation not larger than 0.2 dB) was obtained. Further, as a result of measuring the transmission characteristic of the coupler after the coupler had been left at 60° C. under humidity of 95% RH for 3 months, it was confirmed that the coupler maintained a stable characteristic (a fluctuation not larger than 0.2 dB).

As described above, the optical fiber coupler according to the method of the present invention has a structure which is not influenced by shrinkage of coating resin or the like. Accordingly, it is possible to manufacture an optical fiber coupler in which stable characteristic can be maintained and which can be mounted with a high density required in light communication or the like.

It has thus been seen that the objectives of this invention have been fully an effectively accomplished. It will be realized, however, that the foregoing preferred embodiment has been shown and described for the purposes of illustrating the structural and functional principles of the present invention and are subject to change without departure from such principles. Therefore, this invention includes all modifications encompassed within the spirit of the following claims.

What is claimed is:

1. A method of reinforcing a multiple optical fiber coupling unit comprising the steps of:
   removing a portion of longitudinal coatings of optical fibers of the multiple optical fiber coupling unit to expose glass portions of said optical fibers;
   fusing a portion of said exposed glass portions so as to optically couple said optical fibers;
   extending the fused portion to a predetermined state;
   fixing non-extended portions of said exposed glass portions on a first reinforcing substrate with a first adhesive; and
   fixing said first reinforcing substrate on a second reinforcing substrate with a second adhesive.

2. A method as claimed in claim 1, wherein said second adhesive is a soft adhesive with Young's modulus thereof being no larger than $0.1 \text{ kg/mm}^2$ at $-40°$ C.

3. A method as claimed in claim 1, wherein said first adhesive is one of a thermosetting and ultraviolet-setting adhesive.

4. A multiple optical fiber coupler unit comprising:
   a plurality of optical fibers optically coupled by fusing ends thereof;
   a first substrate being affixed to said optical fibers near said fused ends by a first adhesive so as to reinforce the coupled optical fibers; and
   a second substrate being affixed to said first substrate by a second adhesive.

5. A multiple optical fiber coupling unit as claimed in claim 4, wherein said first substrate is made from one of quartz and liquid crystal polymers having a coefficient of linear expansion substantially equal to a coefficient of linear expansion of said optical fibers.

6. A multiple optical fiber coupling unit as claimed in claim 4, wherein said second substrate is made from one of liquid crystal polymers and Invar.

7. A multiple optical fiber coupling unit as claimed in claim 4, wherein said second substrate is of cylindrical configuration.

8. A multiple optical fiber coupling unit as claimed in claim 4, wherein said second substrate is of box-like configuration.

9. A multiple optical fiber coupling unit as claimed in claim 4, wherein said first adhesive is one of a thermosetting and ultraviolet-setting adhesive.

10. A multiple optical fiber coupling unit as claimed in claim 4, wherein said second adhesive is flexible silicon rubber adhesive.

11. A multiple optical fiber coupling unit as claimed in claim 4, wherein Young's modulus of said second adhesive at $-40°$ C. is not larger than $0.1 \text{ kg/mm}^2$.

* * * * *